United States Patent [19]

Van Engeland et al.

[11] 3,793,015

[45] Feb. 19, 1974

[54] DISPERSION OF PARTICLES IN AN ORGANIC LIQUID

[75] Inventors: Jozef Leonard Van Engeland, St. Katelijne Waver; Noel Jozef De Volder; Bernard Hippoliet Tavernier, both of Edegem; Albert Lucien Poot, Kontich, all of Belgium

[73] Assignee: Gevaert-AGFA N. V., Mortsel, Belgium

[22] Filed: Apr. 2, 1971

[21] Appl. No.: 130,781

Related U.S. Application Data

[63] Continuation of Ser. No. 613,759, Feb. 3, 1967, abandoned.

[30] Foreign Application Priority Data
Feb. 4, 1966    Great Britain...................... 5057/66

[52] U.S. Cl. ............. 96/1 LY, 117/37 LE, 252/62.1
[51] Int. Cl. ........................... G03g 9/02, G03g 5/04
[58] Field of Search....... 252/62.1, 32.5; 117/37 LY; 96/1 LY

[56] References Cited
UNITED STATES PATENTS 3,362,907    1/1968    Mathon et al. .................... 252/62.1
2,228,659    1/1941    Farrington ............................ 252/35
2,228,671    1/1941    Neely et al............................ 252/37
2,616,904    11/1952   Asseff et al. ......................... 260/399
3,402,188    9/1968    Wiese .................................. 260/429
3,484,505    12/1969   Cyba.................................... 260/925

Primary Examiner—Norman G. Torchin
Assistant Examiner—J. P. Brammer
Attorney, Agent, or Firm—William J. Daniel

[57]    ABSTRACT

A developing liquid for developing electrostatic images in electrophotographic reproduction in which electrostatically attractable pigment particles are dispersed in a non-polar, substantially water-immiscible organic liquid using as the dispersion assistant a bivalent or trivalent metal salt of a phosphorus oxyacid containing at least one organic residue having four or more carbon atoms. Preferred metal cations of the salt are zinc, cadmium, copper, aluminum and iron. The organic residue can be an aliphatic radical with a branched structure being preferred, and from 10 to 18 carbon atoms is an optimum range.

18 Claims, No Drawings

DISPERSION OF PARTICLES IN AN ORGANIC LIQUID

This application is a continuation of Ser. No. 613,759 filed Feb. 3, 1967 and now abandoned.

The present invention relates to a liquid composition for use in the development of electrostatic images, and to a method of forming a suspension of electrostatically attractable particles in an organic liquid.

Processes of developing electrostatic images based on the phenomenon of electrophoresis have already been described, e.g., in British Pat. Specification No. 755,486 and U.S. Pat. Specification No. 2,907,674.

In electrophoretic development processes a distinction is made between developers, the pigments of which have a positive charge, and those using pigments which possess a negative charge. The charge value and the polarity of the pigment particles are modified by means of a so-called control agent.

In order to be able to fix the pigment particles on the places where they deposited electrostatically, each particle is normally surrounded by a thermoplastic resin envelope, this resin at the same time being capable of playing the part of control agent.

Further in that type or developer use is made of a dispersing agent in order to maintain the pigment particles in dispersed state or to make redispersion possible.

It is an object of the present invention to provide an electrophoretic developer containing charged fixable pigment particles.

It is a further object of the present invention to provide an electrophoretic developer wherein electrostatically attractable pigment particles are dispersed in a very stable way in an organic liquid having a non-polar character.

Further objects and advantages of the present invention will appear hereinafter.

It has been found now that a particularly good dispersion of electrostatically attractable pigment particles such as carbon particles can be obtained if said particles are dispersed in a non-polar organic liquid by means of a compound which is a bivalent or trivalent metal (e.g., zinc, cadmium, copper, aluminium or iron) salt of an oxyacid derived from phosphorus containing at least one organic residue, preferably all hydrogen atoms which can be replaced by a metal atom being substituted. Preference is given to a bivalent or trivalent metal salt of a. a monoester or diester of an oxyacid derived from phosphorus,
b. an oxyacid derived from phosphorus and containing one or two organic radicals linked to the phosphorus atom by a carbon atom, or
c. an oxyacid derived from phosphorus and containing an ester group and an organic radical linked by a carbon atom to the phosphorus atom. The said radical can be aliphatic, cycloaliphatic or aromatic.

The salt preferably comprises an organic residue (e.g., organic radical(s) and/or ester groups(s) comprising a chain of at least four carbon atoms, preferably from 10 to 18 carbon atoms, and such chain may be substituted and/or interrupted by hetero-atom(s), e.g., oxygen, sulphur, or nitrogen atom(s).

In order to obtain a good solubility in the organic solvents used in the preparation of the developer it has proved advantageous to use such salts comprising one or more organic radicals with branched structure, e.g., branched aliphatic radicals, such as a 2-butyl-octyl radical.

Suitable dispersing agents for use according to the present invention can be represented by one of the following general formulae:

A. Hypo-, ortho-, and pyrophosphates
1. $Me^{II}(RPO_3)_2$
2. $Me^{II}(RPO_4)$
3. $Me^{II}(RHPO_4)_2$
4. $Me^{II}(R_2PO_4)_2$
5. $Me^{II}(R_2P_2O_7)$
6. $Me^{III}(RPO_3)_3$
7. $Me_2^{III}(RPO_4)_3$
8. $Me^{III}(RHPO_4)_3$
9. $Me^{III}(R_2PO_4)_3$
10. $Me_2^{III}(R_2P_2O_7)_3$ B. Phosphonates
1. $Me^{II}(RPO_3)$
2. $Me^{II}(RHPO_3)_2$
3. $Me_2^{III}(RPO_3)_3$
4. $Me^{III}(RHPO_3)_3$ C. Phosphinates
1. $Me^{II}(R_2PO_2)_2$
2. $Me^{III}(R_2PO_2)_3$ D. Esters of phosphonates
1. $Me^{II}(R_2PO_3)_2$
2. $Me^{III}(R_2PO_3)_3$ wherein:
$Me^{II}$ is a bivalent metal cation,
$Me^{III}$ is a trivalent metal cation, and
R is an organic radical containing at least four carbon atoms, preferably an alkyl radical including a substituted alkyl radical; when substituted, the alkyl radical preferably is substituted with hydrophobic non-polar groups or radicals, e.g., halogen, preferably fluorine.

The preparation of the metal salts of oxyacids derived from phosphorus as defined is quite simple. According to an efficient preparation method a stoichiometric quantity of oxyacid is dissolved in an aliphatic alcohol and added to a solution or suspension of a metal acetate in an aliphatic alcohol. The metal salt of the oxyacid of phosphorus normally separates by precipitation in the alcohol or is obtained therefrom by evaporation of the solvent.

A more detailed description of the preparation of dispersion agents suitable for use according to the present invention is given hereinafter.

PREPARATION 1

Zinc dibutyl phosphinate.

10 g of dibutyl phosphinate are dissolved in 50 ccs of methanol and added to a solution of 6.23 g of zinc acetate dihydrate in 50 ccs of methanol. The precipitate formed is sucked off and washed with methanol.

Percent of Zn calculated : 15.6
Percent of Zn found : 15.4

PREPARATION 2

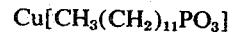

Copper(II) lauryl phosphonate.

4 g of copper(II) acetate monohydrate are dissolved in 250 ccs of methanol at 50°C. On adding to the warm solution 5 g of lauryl phosphonate, the copper(II) lauryl phosphonate precipitates, which is washed with methanol of 50°C.

Percent of Cu calculated : 20.38
Percent of Cu found : 20.35

PREPARATION 3

A solution of 12.7 g of bis(1,1,2,2,3,3,4,4,5,5,6,6,7,-7,8,8,9,9,10,10-fluoroundecyl)phosphate dissolved in 50 ccs of methanol is added to 1.1 g of zinc acetate.2 water in 20 ccs of methanol. The solution obtained is evaporated till dry. The residue left is washed with water and dried at 105°C.
Zn calculated : 2.82
Zn found : 2.81

PREPARATION 4

1. Mono(2-butyl)-octyl phosphate

A solution of 2 moles of 2-butyloctanol in 500 ccs of dichloroethane is dropwise added whilst stirring to a solution of 2 moles of phosphorus oxychloride and 2.05 moles of pyridine in 500 ccs of dichloroethane, while the temperature is maintained at about 22°C. The pyridine hydrochloride formed is filtered with suction and the filtrate is concentrated by evaporation. The residual oil is mixed with 1 litre of water and heated for 2 h on a boiling waterbath whilst stirring. Then the mixture is extracted with benzene, whereupon the latter is evaporated under reduced pressure and the residue obtained is completely degased by means of an oil pump. Yield: about 70 percent calculated with respect to the alcohol.

2. Zinc salt of mono(2-butyl)-octyl phosphate

This zinc salt is precipitated by adding whilst stirring a solution of 1 mole of zinc acetate dihydrate in 750 ccs of methanol at 55°C to a solution of 0.7 mole of mono(2-butyl)-octyl phosphate in 500 ccs of methanol.

After ½ h the supernatant liquid layer is eliminated and the precipitate obtained is heated thrice for 15 min. in 350 ccs of methanol on a water-bath and decanated each time.

After the last decantation the residue is dissolved whilst being refluxed in 1.7 l of acetone. On cooling, the zinc salt crystallizes from this solution. Yield: 75–80 percent calculated with respect to the phosphate.

In addition to the named dispersing agents a preferred liquid composition suited for use in the development of electrostatic charge images comprises the following ingredients:

a. the carrier liquid, which is preferably an organic liquid mainly consisting of a non-polar organic solvent, in other words a liquid which is not or practically non-miscible with water, and has preferably a boiling point not lower than 150°C and not higher than 220°C, e.g., a mixture of aliphatic hydrocarbons boiling above 150°C. Good results are obtained by using therefor SHELLSOL T, which is a tradename of Belgian Shell Company N.V., Brussels, Belgium for a mixture of aliphatic hydrocarbons having the following characteristics:

density at 15°C — 0.764
boiling range — 180°–200°C
viscosity at 25°C — 1.62 cP
Kauri-Butanol number (KB) — 31 b. the pigment, which may be black or coloured but which is preferably carbon black of a particle size of 10–100 m$\mu$. Other suitable pigments are, e.g., Brilliant Green (C.I. 42,040) and phthalocyanine pigments.

c. a fixing substance which is however not absolutely necessary since the phosphorus derivatives as described above are film-forming and water-insoluble. For fixing purposes they have however to be used in some higher amount as they are to be used for dispersing purposes alone.

As fixing substances normally resins are used, e.g., those described for that purpose in U.S. Pat. Specification No. 2,907,674, British Pat. Specification No. 998,184, the published Dutch Pat. Application No. 64/07,923 and the Belgian Pat. Specification Nos. 636,708 and 637,734.

As preferred fixing agents giving abrasion resistance are used esters of hydrogenated rosin and "long oil," and medium and short oil alkyd resins of (iso)phthalic acid, glycerol and pentaerythritol as, e.g., SUPER BECKOSOL 1352 (trade-name of Reichhold-Beckacite S.A., Bezons, S.-et-O., France), and polymerized linseed oil.

Optionally, the developer contains also a control substance, which imparts to the pigment particles a charge or a stronger charge of a sign opposite to that of the electrostatically charged areas to be developed.

According to the published Dutch Pat. Specification No. 64/07,923 suitable control agents, which make carbon black negative or more negative are, e.g., linseed oil, sun flower oil, tung oil, tall oil, peanut oil, maize oil, soybean oil, poppy oil, Oiticica oil, lanolin, dehydrated castor oil, boiled linseed oil, safflower oil, and other vegetable drying oils.

The dispersing agent used in the present invention confers a positive charge to pigments such as carbon black. This is interesting in view of the need for a positive developer in document copying on negatively corona-charged layers containing photoconductive zinc oxide.

One of the most important advantages of the above described phosphorus compounds is that they combine in one substance polarizing, fixing and dispersing properties, so that they may be considered in electrophoretic development as being simultaneously a control agent, a fixing agent and a dispersing agent.

The pigment content of a fresh developer normally lies between 0.1 g and 1 g per litre. The developer contains isolated pigment particles or aggregates of pigment particles, e.g. aggregates of carbon black with an average size of the aggregates of $10^{-2}$ to 2 m$\mu$.

When reliance is not to be placed on fixing properties of the dispersing agent, i.e., when a separate fixing agent is incorporated into the developer the ratio by weight of dispersing agent to pigment is suitably between 10 and 200 mg/g. When both the dispersing properties and the fixing properties of the said phosphorus compounds are used, the ratio by weight of phosphorus compound to pigment is suitably between 500 mg/g and 5,000 mg/g.

It is self-explanatory that also mixtures of different phosphorus compounds as described above can be used, e.g., mixtures of metal salts of mono- and di-orthophosphate esters.

The electrophoretic developer according to the present invention can be used for the development of electrostatic images formed by a surplus charge, e.g., surface charge, as is obtained by corona-charging, as well as for the development of electrostatic images obtained by internal charge displacement (internal polarisation) in the recording element (see therefor, e.g., Belgische Chemische Industrie No. 2 (1960), p. 130 and Physical Review Volume 109, No. 5, p. 1506.

As an illustration of electrophoretic developers according to the present invention some typical compositions are given hereinafter:

EXAMPLE 1

An electrophoretic developing composition is prepared as follows:

A mixture of 30 g of carbon black having an average particle size of 20 m$\mu$ is dispersed in 650 ccs of SHELLSOL T (trade-name) with the aid of 45 g of zinc monolauryl phosphate by grinding for 30 h in a ball-mill. Thereupon the concentrated dispersion is diluted with SHELLSOL T (trade-name) in a ratio of 5/1,000 by volume.

The diluted developer dispersion thus obtained has a concentration suitable for the electrophoretic development of a charge image obtained by common negative coronacharging and image-wise exposure of recording layers containing photoconductive zinc oxide.

EXAMPLE 2

Example 1 is repeated but 45 g of zinc monolauryl phosphate are replaced by a same amount of copper-(II)lauryl phosphonate.

EXAMPLE 3

An electrophoretic developing composition having improved fixing properties is obtained by using a fixing agent prepared as follows:

500 g of ALKYDAL L 67 (trade-name of Farbenfabriken Bayer A.G., Leverkusen, W. Germany, for a linseed oil (67 percent by weight) modified alkyd resin) and 500 ccs of white spirit containing 11 percent by weight of aromatic compounds are heated at 60°C till a clear solution A is obtained. After cooling the solution A to room temperature, 150 g thereof are used as fixing agent for the following dispersion:

carbon black (average particle size 20 m$\mu$) — 30 g
zinc monotridecyl phosphate — 1.5 g
SHELLSOL T (trade-name) — 750 ccs.

Mixing of the solution A with the said composition occurs as follows:

150 g of said solution are first ground in a ball-mill with 1.6 g of the zinc monotridecyl phosphate, whereupon 30 g of carbon black are added and at least 750 ccs of SHELLSOL T (trade-name).

After grinding the whole composition for 15 h the obtained concentrated developer is diluted with SHELLSOL T (trade-name) in a ratio of 15/1,000.

The developer thus obtained is very stable and yields quite erasure-proof images after evaporation of the solvent from the recording layer.

EXAMPLES 4–7

Example 3 is repeated but instead of using ALKYDAL L 67 (trade-name) the following modified alkyd resins are used.

| Trade-name | Type of oil-modified alkyd resin | Acid value | Manufactured by |
|---|---|---|---|
| ALKYDAL V 25 | styrene-modified alkyd resin on the base of 15 % of phthalic anhydride and modified with 35 % of vegetable drying oil | <10 | Farbenfabriken Bayer A.G., Leverkusen, W. -Germany |
| ALKYDAL E 43 | low fatty alkyd resin on the base of 40 % of phthalic anhydride modified with 43 % of peanut oil | <20 | idem |
| ALKYDAL S 65 | fatty alkyd resin on the base of 26 % of phthalic anhydride modified with 63 % of soybean oil | <10 | idem |
| PARALAC 10 | fatty acid resin modified with 68 % of drying oil | — | Imperial Chemical Industries Ltd., London, England |
| SUPER-BECKOSOL 1352 | fatty isophthalic acid alkyd resin modified with 60 % of soybean oil | 3 to 7 | Reichhold-Beckacite S.A. Bezons - Paris France |
| BECKOSOL P 323 | medium-fatty alkyd resin on the base of 33 % of phthalic anhydride modified with 53 % of soybean oil | 2 to 8 | idem |
| SCOPOL 41 N | vinyltoluene-modified fatty alkyd resin on the base of 25.5 % of phthalic anhydride, modified with 60 % of dehydrated castor oil | 5 to 8 | Styrene Copolymers Sale Cheshire, England |

EXAMPLE 8

To 100 solution A as described in example 3, 30 g of carbon black, 3 g of zinc dibutyl phosphinate and 650 ccs of SHELLSOL A (trade-name) are added.

SHELLSOL A is a trade-name of the Shell Company for a hydrocarbon mixture containing 97 percent of aromatic compounds and has the following characteristics:

density at 15°C — 0.869
boiling range — 162°–179°C
Kauri Butanol value (KB) — 90

After grinding for 15 hours in a ball-mill, the mixture is diluted in a ratio of 2/100 with SHELLSOL T (trade-name) or with ISOPAR H (trade-name of Standard Oil Company of New Jersey for a mixture of aliphatic hydrocarbons, and having the following characteristics:

density at 15°C — 0.757
boiling range — 177°–188°C
viscosity at 25°C — 1.24 cps
Kauri-Butanol value (KB) — 27)

The obtained developing composition is very stable, and yields very dense pigment deposits with a high degree of fastness to erasure.

EXAMPLE 9

Example 3 is repeated but 3 g of bis(1,1,2,2,3,3,4,4,-5,5,6,6-fluoroheptyl) zinc phosphate are substituted for the 1.5 g of zinc monotridecyl phosphate.

The same good results are obtained.

EXAMPLE 10

An electrophoretic developing composition is prepared as follows:

A mixture of 100 g of carbon black having an average particle size of 28 nm is dispersed in 1,030 ccs of Isopar H (trade-name) with the aid of 10 g of zinc mono(2-butyl)-octyl phosphate by stirring for 2 min. in a speed mixer known as a Waring Blendor at a speed of 28,500 rpm.

Thereupon the concentrated dispersion is diluted with Isopar H (trade-name) in a ratio of 5/1,000 by volume.

The diluted developer dispersion thus obtained has a concentration suitable for the electrophoretic development of a charge image obtained by common negative coronacharging and image-wise exposure of a recording layer containing photoconductive zinc oxide.

EXAMPLE 11

An electrophoretic developing composition having improved fixing properties is obtained by using a fixing agent prepared as follows:

400 of SUPER BECKOSOL BA 30/70 W (trade-name of Reichhold-Beckacite S.A., Bezons, S.-et-O., France, for a fatty isophthalic acid alkyd resin modified with 63 percent of soybean oil) and 600 ccs of Isopar H (trade-name) are mixed till a clear solution A is obtained.

From this solution A 500 ccs are mixed with the following dispersion:

carbon black (average particle size 28 nm) 100 g
zinc mono(2-butyl)-octyl phosphate 5 g
Isopar H (trade-name) 700 ccs.

Mixing proceeds in the following way:

500 ccs of said solution are first ground in a speed mixer (Waring Blendor) at a speed of 18,500 rpm with 5 g of zinc mono(2-butyl)-octyl phosphate, whereupon 100 g of carbon black and at least 700 ccs of Isopar H (trade-name) are added. After grinding the whole composition for 2 min, the obtained concentrated developer is diluted with Isopar H (trade-name) in a ratio of 1.5/1,000.

The developer thus obtained is very stable and yields quite erasure-proof images after evaporation of the solvent from the recording layer.

We claim:

1. In a method of electrophoretic development of electrostatic images, the improvement of preparing a liquid developer dispersion by dispersing finely divided pigment particles in a nonpolar organic liquid hydrocarbon substantially immiscible with water and having a boiling point within the range of about 150°–220°C in a ratio of 0.1–1 gm/liter by means of a bivalent or trivalent metal salt of an oxyacid derived from phosphorus containing at least one organic residue having at least about four carbon atoms as the essential dispersing agent, said phosphorus oxyacid salt being absorbed on said particles whereby said particles are positively electrically charged when dispersed in said hydrocarbon, and contacting the resultant developer dispersion with an electrophotographic layer carrying an electrostatic charge pattern thereon to develop the relatively negatively charged areas of said recording layer by electrostatic attraction of said positively charged particles thereto.

2. The method of claim 1 wherein a resin binding agent is incorporated in said developer dispersion and said phosphorus oxyacid salt is used in a ratio of about 10–200 mg per g. of said pigment particles to be dispersed.

3. The method of claim 1 wherein said phosphorus oxyacid salt also functions as the essential binder agent for the particles and is used in a ratio of about 500–5000 mg. per g. of said pigment particles to be dispersed.

4. The method of claim 1 wherein said liquid developer dispersion has incorporated therein a polarity control agent to adjust the magnitude of the charge of said charged particles.

5. The method of claim 1 wherein said organic residue of said phosphorus oxyacid salt has a branched structure containing about 10–18 carbon atoms.

6. A liquid electrophoretic developer dispersion for the development of electrostatic images consisting essentially of a nonpolar organic liquid hydrocarbon substantially immiscible with water and having a boiling point within the range of about 150°–220°C, and positively charged electrostatically attractable finely divided particles dispersed in said liquid in the amount of about 0.1–1 gm/liter and having absorbed thereon as a dispersing agent for conferring said positive charge to said particles a bivalent or trivalent metal salt of an oxyacid derived from phosphorus containing at least one organic residue having at least about four carbon atoms.

7. A developer dispersion according to claim 6 wherein the said composition also contains a control agent which adjusts the magnitude of the charge on the dispersed positively charged particles.

8. A liquid developer dispersion according to claim 6 wherein the said metal salt is a salt of:
   a. a monoester or diester of an oxyacid derived from phosphorus,
   b. an oxyacid derived from phosphorus and containing one or two of said organic radicals linked to the phosphorus atom with a carbon atoms, or
   c. an oxyacid derived from phosphorus and containing an ester group and said organic radical is linked with a carbon atom to the phosphorus atom.

9. A developer dispersion according to claim 6 wherein the said salt is a zinc, cadmium, copper, aluminum or iron salt.

10. A developer dispersion according to claim 6 wherein the salt comprises at least one organic residue containing 10 to 18 carbon atoms.

11. A developer dispersion according to claim 6 wherein the organic residue has a branched structure.

12. A developer dispersion according to claim 6 wherein the organic residue is an aliphatic radical having a branched structure or substituted with an hydrophobic radical.

13. A developer dispersion according to claim 6 wherein the non-polar organic liquid is a mixture of aliphatic hydrocarbons containing only a minor amount of aromatic hydrocarbons.

14. A developer dispersion according to claim 6 wherein the positively charged particles also include a resin fixing agent.

15. A developer dispersion according to claim 6 wherein the said particles are positively charged carbon particles.

16. A developer dispersion according to claim 6 wherein the bivalent or trivalent salt is one selected from the group consisting of:
A. hypo-, ortho-, and pyrophosphates having any of the formulae:
   1. $Me^{II}(RPO_3)_2$
   2. $Me^{II}(RPO_4)$
   3. $Me^{II}(RHPO_4)_2$
   4. $Me^{II}(R_2PO_4)_2$
   5. $Me^{II}(R_2P_2O_7)$
   6. $Me^{III}(RPO_3)_3$
   7. $Me_2^{III}(RPO_4)_3$
   8. $Me^{III}(RHPO_4)_3$
   9. $Me^{III}(R_2PO_4)_3$
   10. $Me_2^{III}(R_2P_2O_7)_3$
B. Phosphonates having any of the formulae:
   1. $Me^{II}(RPO_3)$
   2. $Me^{II}(RHPO_3)_2$
   3. $Me_2^{III}(RPO_3)_3$
   4. $Me^{III}(RHPO_3)_3$
C. Phosphinates having any of the formulae:
   1. $Me^{II}(R_2PO_2)_2$
   2. $Me^{III}(R_2PO_2)_3$, and
D. Esters of phosphonates having any of the formulae:
   1. $Me^{II}(R_2PO_3)_2$
   2. $Me^{III}(R_2PO_3)_3$
wherein:
$Me^{II}$ is a bivalent metal cation,
$Me^{III}$ is a trivalent metal cation, and
R is an organic radical containing at least four carbon atoms.

17. A developer dispersion according to claim 6 wherein the bivalent metal salt is zinc monotridecyl phosphate.

18. A developer dispersion according to claim 6 wherein the bivalent metal salt is zinc(2-butyl)-octyl phosphate.

* * * * *